United States Patent
Abe

(10) Patent No.: US 9,821,742 B2
(45) Date of Patent: Nov. 21, 2017

(54) RADIATOR GRILLE

(71) Applicant: FALTEC Co., Ltd., Kawasaki-shi (JP)

(72) Inventor: Yasuyuki Abe, Zushi (JP)

(73) Assignee: FALTEC Co., Ltd., Kawasaki-shi (JP)

( * ) Notice: Subject to any disclaimer, the term of this patent is extended or adjusted under 35 U.S.C. 154(b) by 0 days.

(21) Appl. No.: 15/021,404

(22) PCT Filed: Oct. 21, 2014

(86) PCT No.: PCT/JP2014/077930
§ 371 (c)(1),
(2) Date: Mar. 11, 2016

(87) PCT Pub. No.: WO2015/064420
PCT Pub. Date: May 7, 2015

(65) Prior Publication Data
US 2016/0221522 A1    Aug. 4, 2016

(30) Foreign Application Priority Data
Oct. 28, 2013  (JP) .................................. 2013-223536

(51) Int. Cl.
*B60N 99/00*       (2006.01)
*B60R 19/52*       (2006.01)

(52) U.S. Cl.
CPC ........ *B60R 19/52* (2013.01); *B60R 2019/525* (2013.01)

(58) Field of Classification Search
CPC ........................... B60R 19/52; B60R 2019/525
See application file for complete search history.

(56) References Cited

U.S. PATENT DOCUMENTS

| 7,641,267 | B2 | 1/2010 | Makino |
| 7,887,125 | B2 | 2/2011 | Tazaki et al. |
| 8,157,303 | B2 | 4/2012 | Fortin |
| 2002/0096378 | A1 | 7/2002 | Kobayashi |

FOREIGN PATENT DOCUMENTS

| JP | 59-53150 | 4/1984 |
| JP | 60-16647 | 2/1985 |
| JP | 60-165252 | 11/1985 |
| JP | 02-60649 | 5/1990 |
| JP | U-A-03-040147 | 4/1991 |
| JP | 2002-211337 A | 7/2002 |
| JP | A-2003-104142 | 4/2003 |
| JP | A-2003-191808 | 7/2003 |
| JP | A-2004-330853 | 11/2004 |

(Continued)

OTHER PUBLICATIONS

Russian First Office Action dated Feb. 1, 2017 for Application No. 2016110717.

(Continued)

*Primary Examiner* — Lori L Lyjak
(74) *Attorney, Agent, or Firm* — Moser Taboada; Praveer K. Gupta

(57) ABSTRACT

A radiator grille includes: an inner grille arranged on a front ventilation opening of a vehicle body; an outer grille arranged in front of the inner grille; a coupling part which couples the inner grille to the outer grille; and an attachment part which attaches the inner grille and the outer grille to the vehicle body. Also, the coupling part and the attachment part are arranged close to each other.

7 Claims, 14 Drawing Sheets

(56) References Cited

FOREIGN PATENT DOCUMENTS

| JP | A-2004-352136 | 12/2004 |
| JP | A-2009-006900 | 1/2009 |
| JP | 2010-100228 A | 6/2010 |
| JP | A-2010-241216 | 10/2010 |
| JP | 2012-218523 A | 11/2012 |
| RU | 145851 U1 | 9/2014 |

OTHER PUBLICATIONS

International Search Report, PCT/JP2014/077930, dated Jan. 6, 2015, pp. 1-2.
Japan Office Action dated Oct. 10, 2017 for Application No. 2013-223536.

13, 15 (30, 50)

RADIATOR GRILLE

CROSS-REFERENCE TO RELATED APPLICATIONS

This application claims the benefit of Japanese Patent Application No. 2013-223536, filed Oct. 28, 2013, the content of which is incorporated herein by reference.

BACKGROUND

Technical Field

The present invention relates to a radiator grille.

Background Art

A radiator grille arranged in front of a radiator is mounted on a vehicle. The radiator grille is also called a front grille.

In order to improve design of the radiator grille, a radiator grille including two members has been proposed (refer to Patent Document 1).

The radiator grille described in Patent Literature 1 includes an inner grille and an outer grille. The inner grille is directly attached to a vehicle body, and the outer grille is arranged in front of the inner grille. The design of the outer grille is enhanced by, for example, surface treatment such as plating and painting applied to the outer grille.

The inner grille and the outer grille are coupled to each other using a coupling screw or the like. By using an attachment screw, the outer grille is attached to the vehicle body at a position different from a coupling position of the inner grille and the outer grille.

PRIOR ART DOCUMENTS

Patent Documents

[Patent Document 1]
Japanese Unexamined Patent Application, First Publication No. 2010-100228

DISCLOSURE OF INVENTION

Problem to be Solved by Invention

However, the conventional radiator grille has a problem in that the number of components and the number of assembling processes are increased since a coupling position and an attachment position are different from each other, resulting in a cost increase.

In addition, in the conventional radiator grille, since an outer grille is indirectly attached to a vehicle body via an inner grille, a gap is easily generated between the outer grille and the vehicle body. This leads to a problem in that attachment accuracy between the outer grille and the vehicle body is deteriorated.

A possible solution to these problems is to attach the outer grille directly to the vehicle body. However, when the outer grille is mounted on the vehicle body, a front surface of the outer grille or the like might be deformed and appearance quality might be deteriorated due to an influence of tightening torque applied to an attachment screw.

The present invention has been made in consideration of the above-mentioned circumstances, and an object thereof is to provide a radiator grille capable of suppressing the cost as well as maintaining and improving the attachment accuracy and design.

Means for Solving the Problem

A radiator grille according to an aspect of the present invention includes: an inner grille arranged on a front ventilation opening of a vehicle body; an outer grille arranged in front of the inner grille; a coupling part which couples the inner grille to the outer grille; and an attachment part which attaches the inner grille and the outer grille to the vehicle body, wherein the coupling part and the attachment part are arranged close to each other.

The coupling part and the attachment part may be arranged to overlap each other in a front-rear direction.

The coupling part may include: a first attachment part formed on the inner grille; a locking claw formed on the inner grille and facing the first attachment part in the front-rear direction; and a second attachment part formed on the outer grille, and the inner grille and the outer grille may be configured to be coupled and fixed to each other by holding the second attachment part between the first attachment part and the locking claw.

The locking claw may have a flexible part that bends in a direction crossing the front-rear direction, and the second attachment part may have a second outer peripheral edge configured to bend the flexible part when the inner grille and the outer grille are coupled to each other.

The attachment part may include: a first attachment part formed on the inner grille; and a second attachment part formed on the outer grille, and the first attachment part may be configured to be held between a vehicle body attachment part formed on an opening edge of the front ventilation opening and the second attachment part while the inner grille and the outer grille are attached to the vehicle body.

The first attachment part and the second attachment part may also be used as the attachment part.

The second attachment part may have a first outer peripheral edge formed in a non-circular shape, and the first attachment part may have a side wall that faces and comes into contact with the first outer peripheral edge.

The first attachment part may have a positioning hole arranged at a position corresponding to a vehicle body-positioning hole formed in the vehicle body attachment part, and the second attachment part may have a positioning boss that is fit into the vehicle body-positioning hole and the positioning hole.

Effects of the Invention

By using a radiator grille according to the above-mentioned aspect of the present invention, cost can be reduced due to a small number of fastening positions. In addition, by using the radiator grille according to the above-mentioned aspect of the present invention, attachment accuracy between the outer grille and the vehicle body is improved since the outer grille is directly attached to the vehicle body. Furthermore, by using the radiator grille according to the above-mentioned aspect of the present invention, appearance quality of the outer grille can be maintained since an influence of tightening torque applied when the outer grille is attached to the vehicle body is suppressed.

EMBODIMENTS FOR CARRYING OUT THE INVENTION

Hereinafter, a radiator grille according to an embodiment of the present invention is described with reference to the accompanying drawings.

Figure 1A:
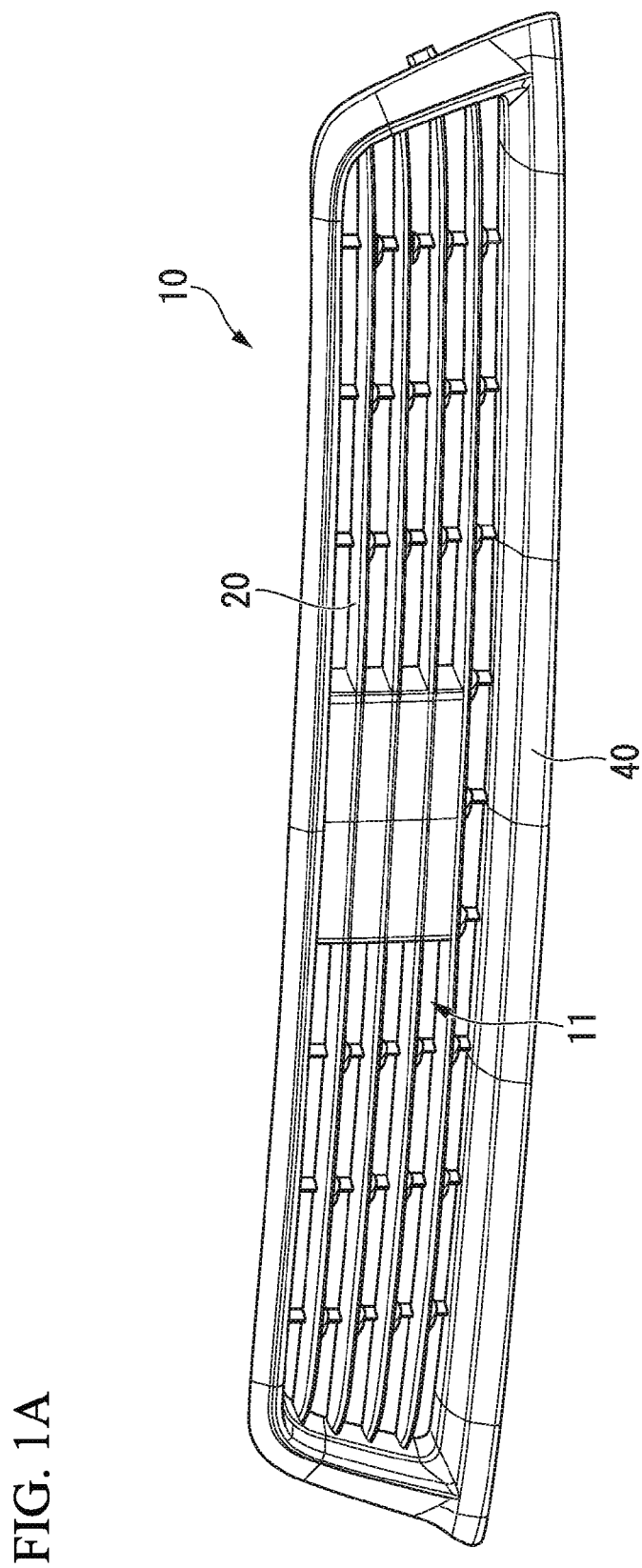
FIG. 1A is a front perspective view representing a radiator grille 10 according to an embodiment of the present invention.
Figure 1B:
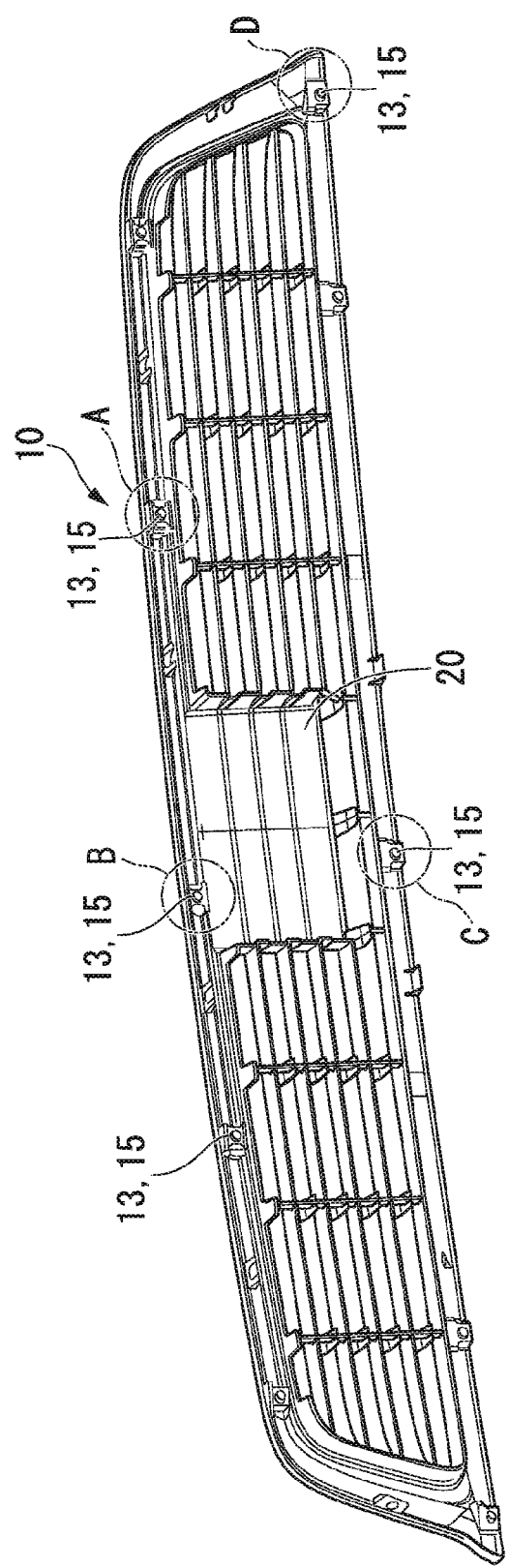
FIG. 1B is a back perspective view representing the radiator grille 10 according to the embodiment of the present invention.

FIGS. 1A and 1B are perspective views representing the radiator grille 10 according to the embodiment of the present invention, where FIG. 1A is a front view, and FIG. 1B is a back view.

Figure 2A:
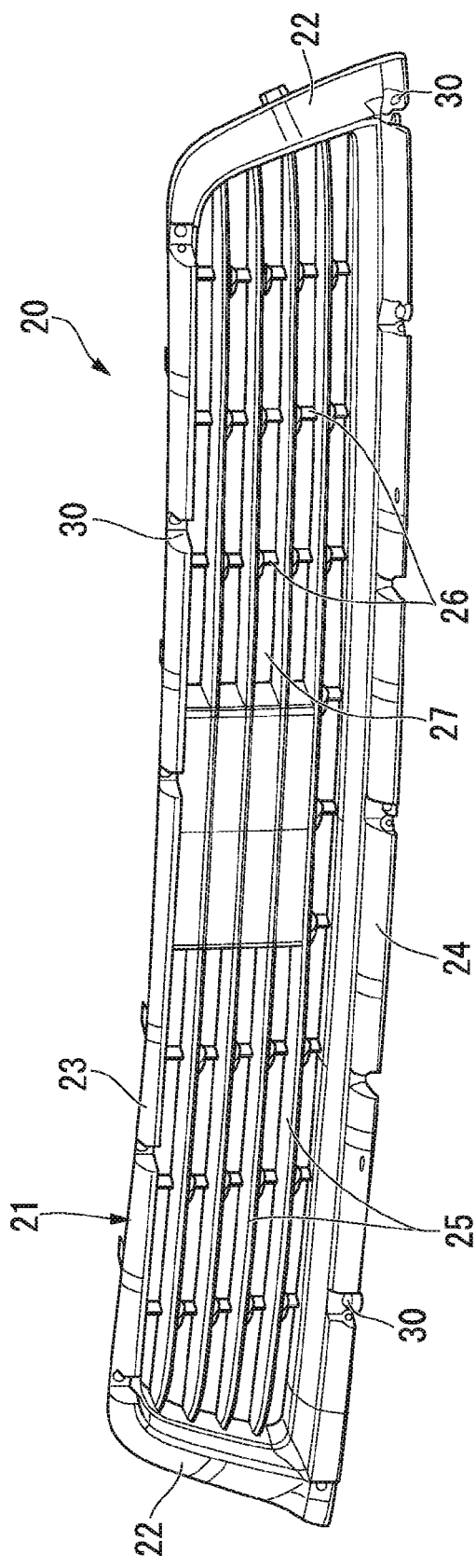
FIG. 2A is a front perspective view representing an inner grille 20.
Figure 2B:
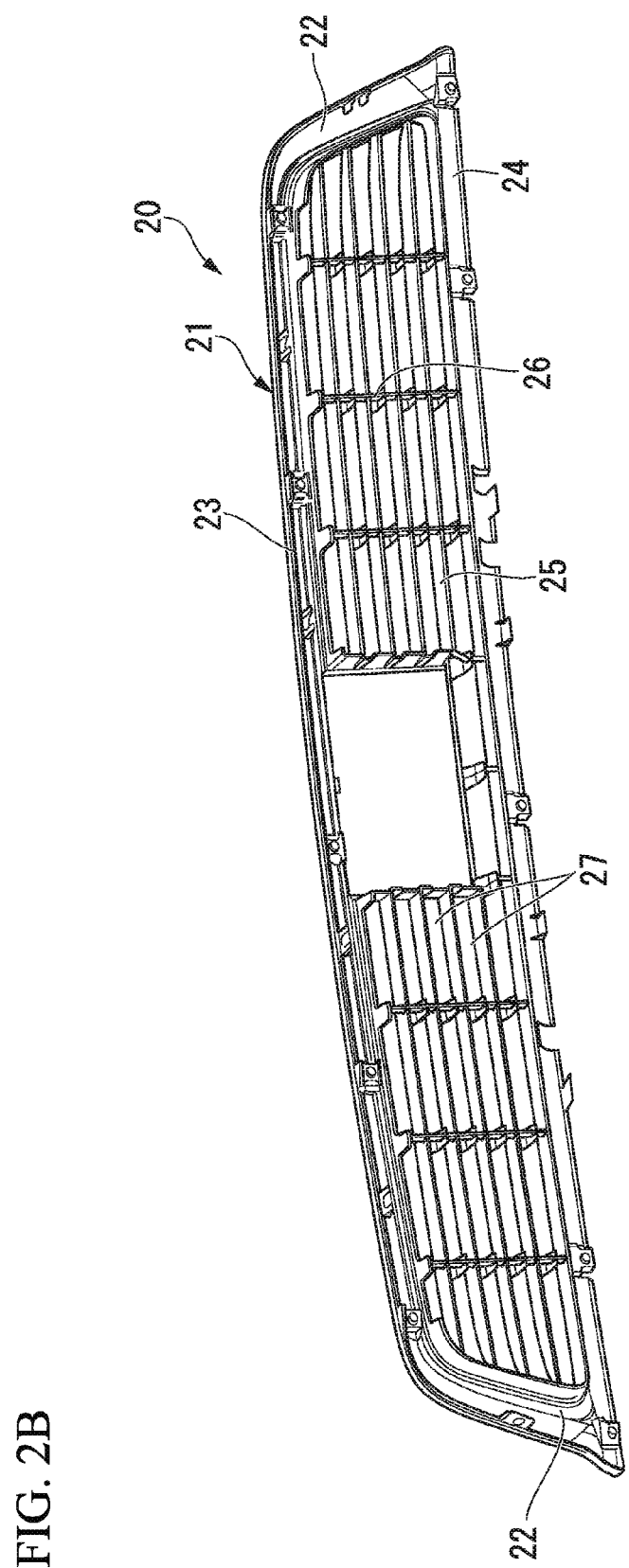
FIG. 2B is a back perspective view representing the inner grille 20.

FIGS. 2A and 2B are perspective views representing an inner grille 20 constituting the radiator grille 10, where FIG. 2A is a front view, and FIG. 2B is a back view.

Figure 3A:
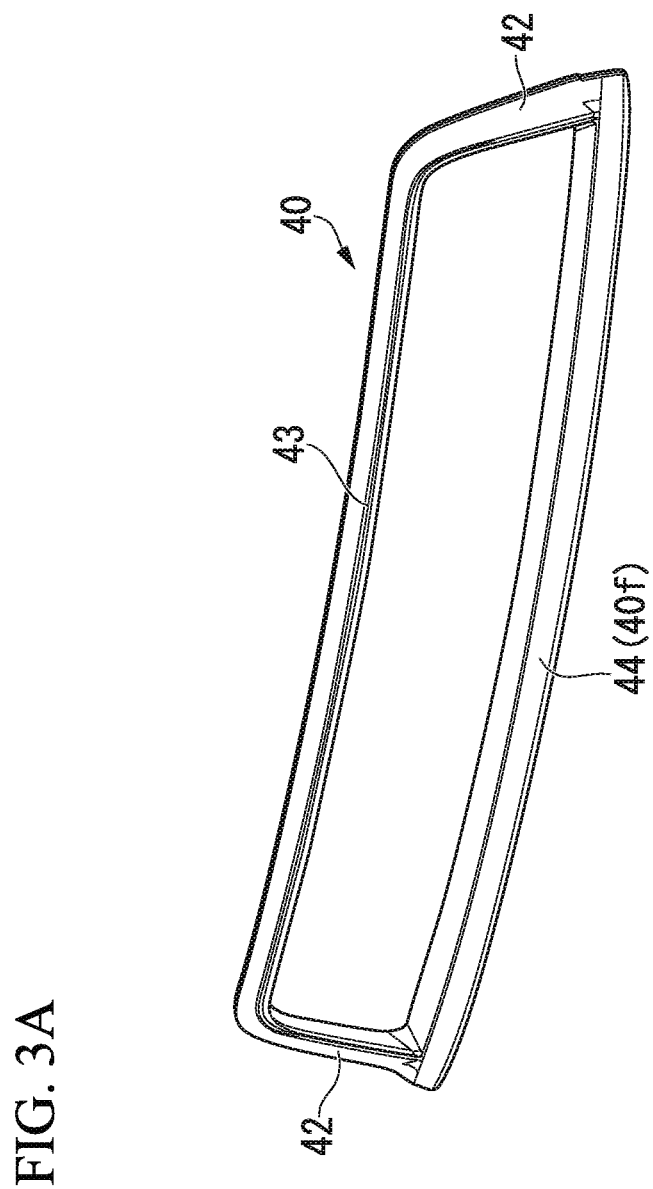
FIG. 3A is a front perspective view representing an outer grille 40.
Figure 3B:
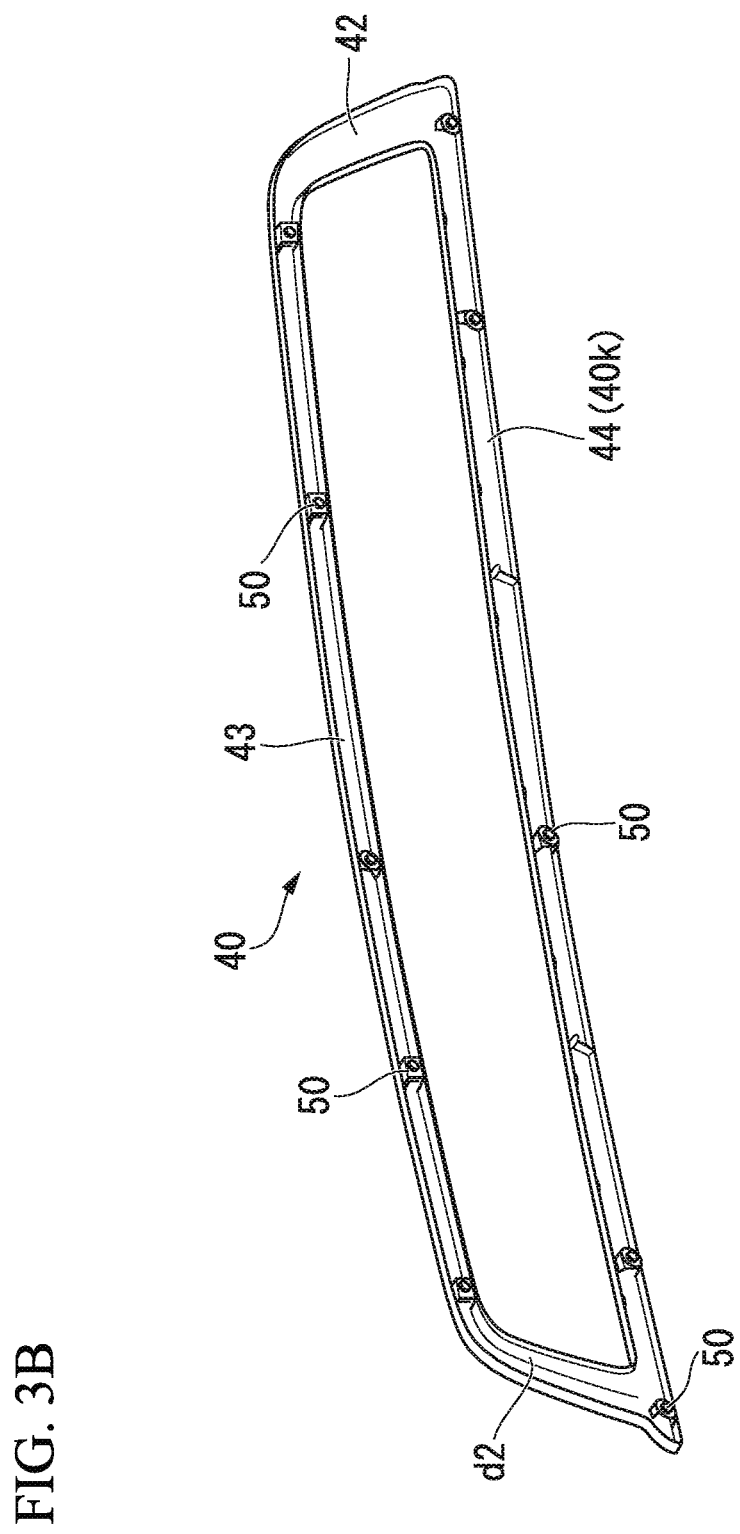
FIG. 3B is a back perspective view representing the outer grille 40.

FIGS. 3A and 3B are perspective views representing an outer grille 40 constituting the radiator grille 10, where FIG. 3A is a front view, and FIG. 3B is a back view.

As illustrated in FIGS. 1A and 1B, the radiator grille 10 is arranged so as to cover a front ventilation opening 2 of a vehicle (vehicle body 1). The front ventilation opening 2 is formed between headlights (not illustrated). A vent opening 11 is formed in the radiator grille 10, and introduces travel air to a radiator (not illustrated) provided in an engine room behind the radiator grille 10.

A front-rear direction of the radiator grille 10 is assumed to be an X direction. The X direction corresponds to a front-rear direction of the vehicle body 1.

A longitudinal direction of the radiator grille 10 is assumed to be a Y direction. The Y direction corresponds to a width direction of the vehicle body 1. The Y direction is also referred to as the width direction or a left-right direction.

An up-down direction of the radiator grille 10 is assumed to be a Z direction. The Z direction corresponds to an up-down direction of the vehicle body 1.

The radiator grille 10 includes the inner grille 20 and the outer grille 40. The inner grille 20 is arranged on the front ventilation opening 2 of the vehicle body 1, and the outer grille 40 is arranged in front of the inner grille 20.

The radiator grille 10 includes a coupling part 13 and an attachment part 15. The coupling part 13 is a component that couples the inner grille 20 to the outer grille 40. The attachment part 15 is a component or the like that attaches the radiator grille 10 (coupled state of the inner grille 20 and the outer grille 40) to the front ventilation opening 2 of the vehicle body 1.

The coupling part 13 and the attachment part 15 are arranged close to each other. The coupling parts 13 and the attachment parts 15 are provided at a plurality of positions on the radiator grille 10. The number of coupling parts 13 is the same as the number of attachment parts 15.

As illustrated in FIGS. 2A and 2B, the inner grille 20 is a resin-molded product that covers a substantially entire surface of the front ventilation opening 2. The inner grille 20 has a frame 21, a crosspiece 25, and a vertical rib 26 or the like.

The frame 21 is a thick rectangular annular component formed along an inner edge of the front ventilation opening 2. The frame 21 is formed such that the inner edge of the front ventilation opening 2 is surrounded by a pair of left and right vertical frames 22 and a pair of upper and lower lateral frames 23, 24.

The left and right vertical frames 22 extend in the up-down direction along inner end surfaces of the headlights (not illustrated). The upper lateral frame 23 extends in the width direction along a lower end surface of a hood (not illustrated). The lower lateral frame 24 extends in the width direction along an upper end surface of a bumper (not illustrated).

The crosspiece 25 is an elongated planar component extending in the left-right direction within the frame 21. A plurality of the crosspieces (four crosspieces) 25 extends substantially in parallel in the left-right direction, and is arranged at intervals in the up-down direction.

The vertical rib 26 is an elongated planar component extending in the up-down direction within the frame 21. A plurality of the vertical ribs (nine vertical ribs) 26 extends substantially in parallel in the up-down direction, and is arranged at intervals in the left-right direction.

Each of the vertical ribs 26 couples the pair of upper and lower lateral frames 23, 24 to the plurality of crosspieces 25 to reinforce the crosspieces 25.

A plurality of openings 27 is formed by the frame 21, the crosspieces 25, and the vertical ribs 26. The opening 27 has a rectangular shape extending in a lateral direction. The plurality of openings 27 constitutes the vent opening 11.

As illustrated in FIGS. 3A and 3B, the outer grille 40 is a resin-molded product that is arranged to overlap the frame 21 of the inner grille 20. The design of the outer grille 40 is enhanced by, for example, surface treatment such as plating and painting applied to the outer grille 40.

The outer grille 40 has a shape that is substantially the same as the shape of the frame 21 of the inner grille 20.

The outer grille 40 is formed in a frame shape by a pair of left and right vertical frames 42 and a pair of upper and lower lateral frames 43, 44.

The left and right vertical frames 42 extend in the up-down direction along the inner end surfaces of the headlights (not illustrated). The upper lateral frame 43 extends in the width direction along the lower end surface of the hood (not illustrated). The lower lateral frame 44 extends in the width direction along the upper end surface of the bumper (not illustrated).

Next, the coupling part 13 and the attachment part 15 arranged at a position A of FIG. 1B will be described using FIGS. 4 to 8C.

Figure 4:
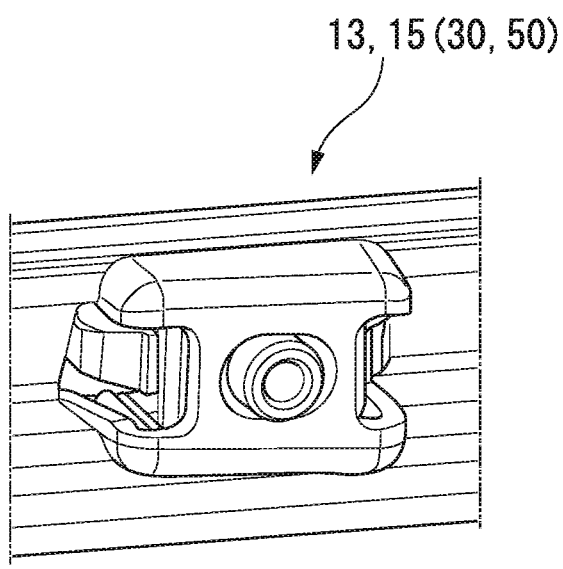
FIG. 4 is a perspective view representing a coupling part 13 and an attachment part 15.

FIG. 4 is a perspective view representing the coupling part 13 and the attachment part 15.

Figure 5:
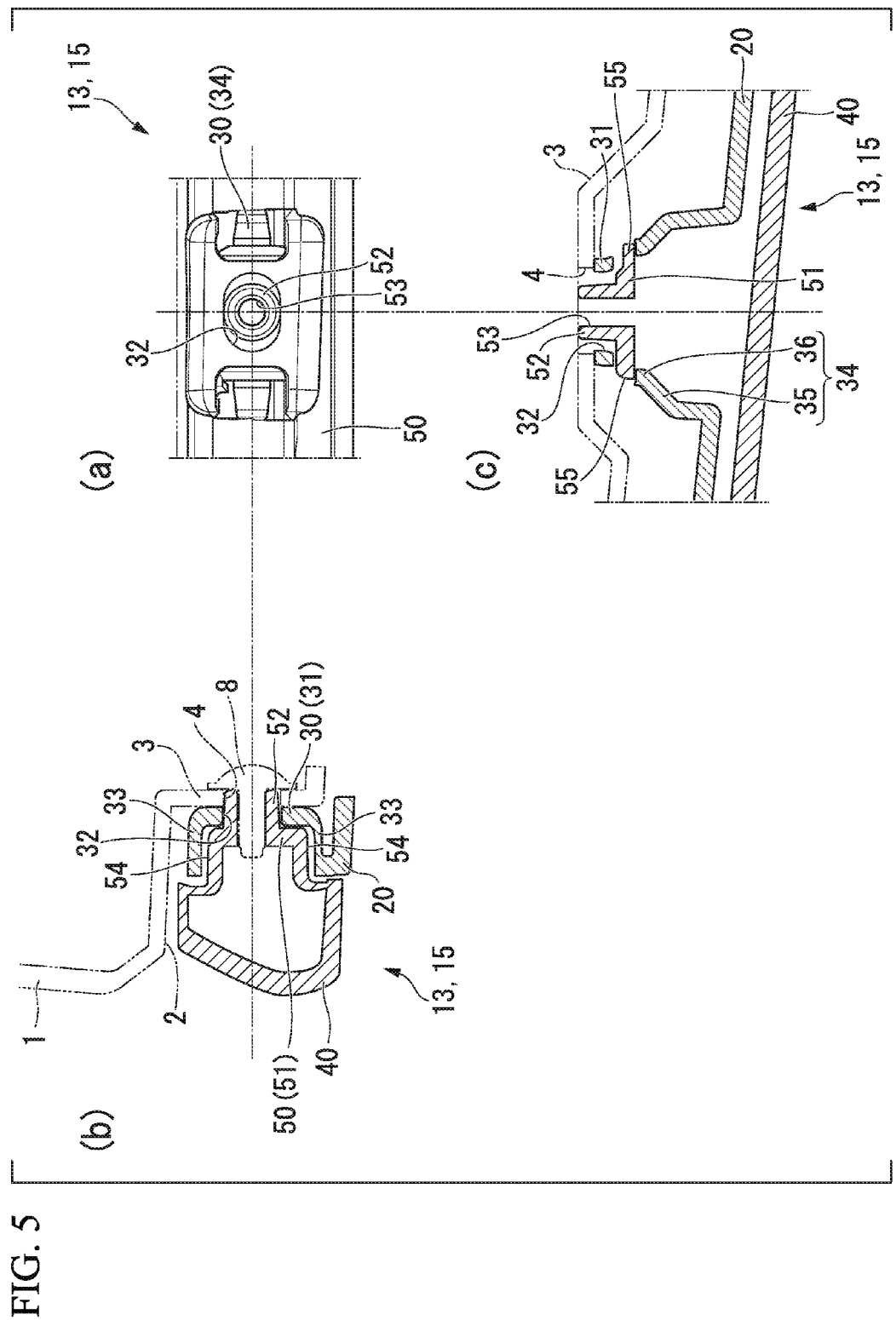
FIG. 5 is a view representing the coupling part 13 and the attachment part 15, where (a) is a back view, (b) is a longitudinal sectional view, and (c) is a cross-sectional view.

FIG. 5 is a view representing the coupling part 13 and the attachment part 15, where (a) is a back view, (b) is a longitudinal sectional view, and (c) is a cross-sectional view. A vehicle body attachment part 3 is not illustrated in the back view in FIG. 5(*a*).

Figure 6A:
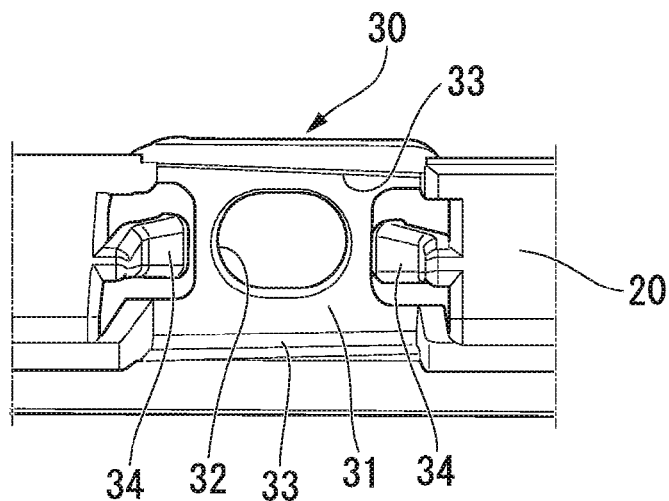
FIG. 6A is a front perspective view representing a first coupling attachment part 30 of the inner grille 20.
Figure 6B:
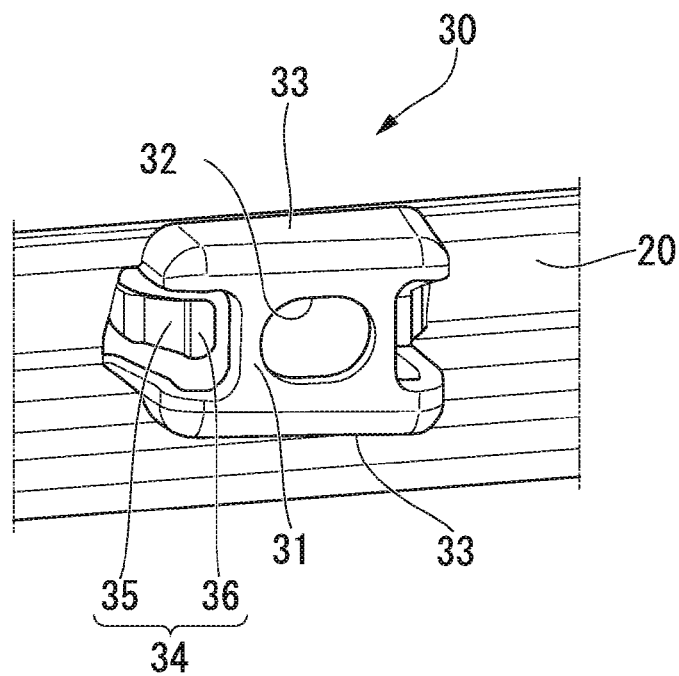
FIG. 6B is a back perspective view representing the first coupling attachment part 30 of the inner grille 20.

FIGS. 6A and 6B are perspective views representing a first coupling attachment part 30 of the inner grille 20, where FIG. 6A is a front view, and FIG. 6B is a back view.

Figure 7:
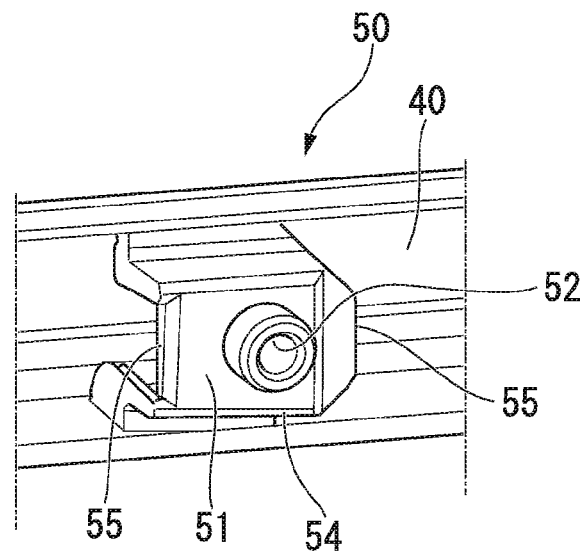
FIG. 7 is a back perspective view representing a second coupling attachment part 50 of the outer grille 40.

FIG. 7 is a back perspective view representing a second coupling attachment part 50 of the outer grille 40.

Figure 8A:
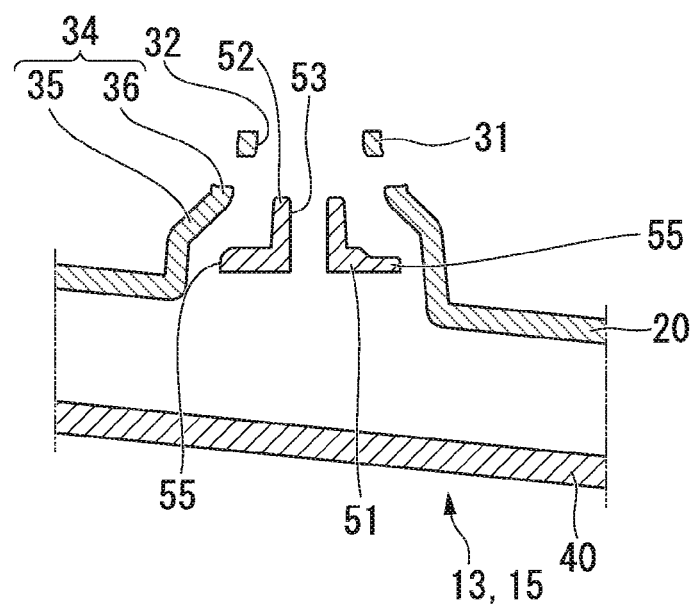
FIG. 8A is a view describing a procedure for assembling the coupling part 13, which represents a state before the assembling.
Figure 8B:
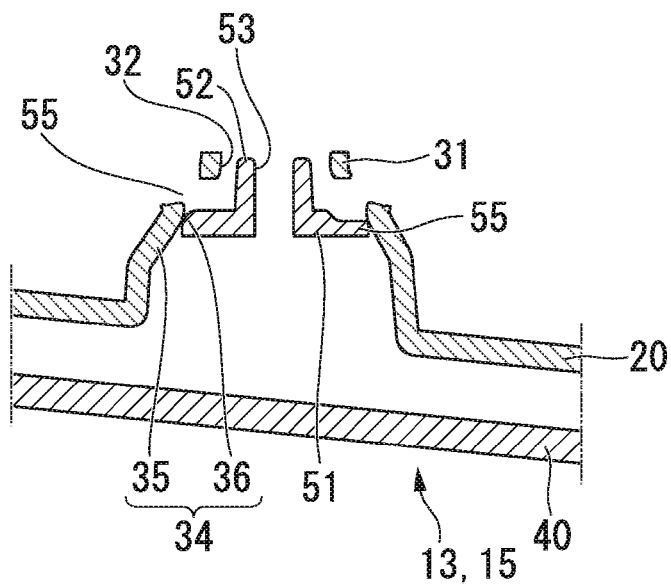
FIG. 8B is a view describing the procedure for assembling the coupling part 13, which represents a state during the assembling.
Figure 8C:
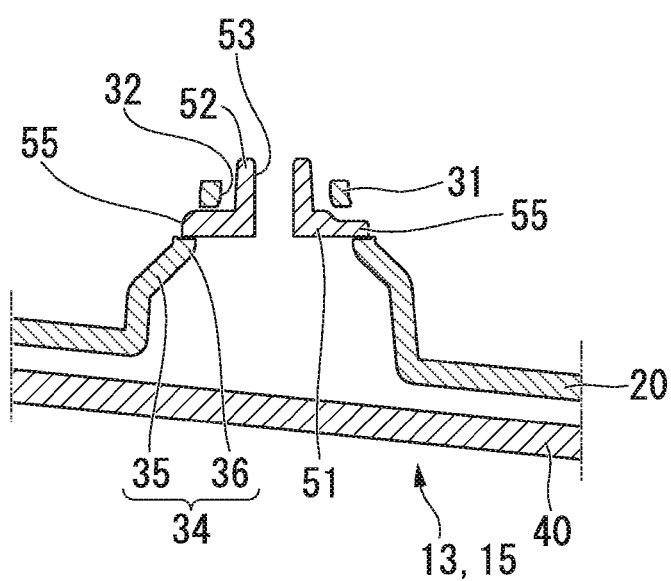
FIG. 8C is a view describing the procedure for assembling the coupling part 13, which represents a state after the assembling.

FIGS. 8A to 8C are views describing a procedure for assembling the coupling part 13, where FIG. 8A represents a state before the assembling, FIG. 8B represents a state during the assembling, and FIG. 8C represents a state after the assembling.

The coupling part 13 illustrated in FIGS. 4 and 5 is a component that couples the inner grille 20 to the outer grille 40.

The coupling part 13 includes the first coupling attachment part 30 and the second coupling attachment part 50.

As illustrated in FIGS. 5, 6A, and 6B, the first coupling attachment part 30 includes a first attachment part 31 and a pair of locking claws 34. The pair of locking claws 34 is arranged in front of the first attachment part 31.

The first coupling attachment part 30 holds a second attachment part 51 of the second coupling attachment part 50 illustrated in FIG. 7 between the first attachment part 31 and the locking claws 34.

As illustrated in FIGS. 6A and 6B, the locking claws 34 each include a flexible part 35 and a claw 36.

The flexible part 35 is an elongated rod-shaped component extending backward from the frame 21, and capable of bending in the left-right direction (direction crossing the front-rear direction). At a distal end of the flexible part 35, the claw 36 abuts on the second attachment part 51 of the second coupling attachment part 50.

The locking claws 34 are provided at both sides in the left-right direction of the first attachment part 31 such that a positioning hole 32 of the first attachment part 31 is arranged between the pair of locking claws 34.

The pair of locking claws 34 is formed such that the distal ends (claws 36) are closer to each other than base ends are to each other. In other words, the flexible part 35 is inclined so as to gradually approach the positioning hole 32 as the flexible part 35 extends backward.

In the left-right direction, a gap is provided between the claws 36 of the pair of locking claws 34. The second attachment part 51 of the second coupling attachment part 50 is inserted into the gap.

In the front-rear direction, a gap is provided between the locking claws 34 (claws 36) and the first attachment part 31. The second attachment part 51 of the second coupling attachment part 50 is inserted into the gap.

As illustrated in FIGS. 5 and 7, the second coupling attachment part 50 includes the second attachment part 51.

Second outer peripheral edges 55 are formed on the second attachment part 51. The second outer peripheral edges 55 are engaged with the locking claws 34 of the first coupling attachment part 30. The second outer peripheral edges 55 are outer peripheral edges formed at both sides in the left-right direction of the second attachment part 51, and formed along the up-down direction.

A distance in the left-right direction between the pair of second outer peripheral edges 55 is smaller than a distance between the base ends of the pair of locking claws 34 of the first coupling attachment part 30, and larger than a distance between the distal ends (claws 36) of the pair of locking claws 34 of the first coupling attachment part 30. The second attachment part 51 has a thickness that is substantially the same as that of the gap between the locking claws 34 (claws 36) and the first attachment part 31 in a natural state.

When the inner grille 20 and the outer grille 40 are coupled to each other, the locking claws 34 and the second outer peripheral edges 55 provide a snap-fit function.

Specifically, as illustrated in FIG. 8A, the second attachment part 51 is arranged in front of the first attachment part 31. Next, as illustrated in FIG. 8B, the second attachment part 51 is moved toward the first attachment part 31. Then, the second attachment part 51 is inserted between the pair of locking claws 34, thereby causing the second outer peripheral edges 55 to abut on the flexible parts 35.

When the second attachment part 51 is further moved toward the first attachment part 31, the flexible parts 35 are pushed by the second outer peripheral edges 55 and start to bend in a direction away from the positioning hole 32 in the left-right direction.

When the second attachment part 51 is brought into close contact with the first attachment part 31, the claws 36 of the locking claws 34 climb over the second outer peripheral edges 55. The flexible parts 35 are then restored from the bent state as illustrated in FIG. 8C, and the claws 36 are arranged on a front surface of the second attachment part 51.

As a result, the first attachment part 31 is brought into close contact with a back surface of the second attachment part 51, and the claws 36 are brought into close contact with the front surface of the second attachment part 51. Even if the second attachment part 51 is moved forward, the claws 36 cannot climb over the second outer peripheral edges 55 since the flexible parts 35 bend in a direction approaching the positioning hole 32.

Therefore, the second attachment part 51 is kept in such a state that the second attachment part 51 is held between the first attachment part 31 and the locking claw 34.

As mentioned above, since the radiator grille 10 includes the coupling part 13, the inner grille 20 and the outer grille 40 can be coupled to each other without using a coupling screw or the like. In other words, the inner grille 20 and the outer grille 40 are coupled and fixed to each other when the second attachment part 51 is held between the first attachment part 31 and the locking claws 34.

The attachment part 15 is a component or a member for attaching the radiator grille 10 (coupled state of the inner grille 20 and the outer grille 40) to the front ventilation opening 2 of the vehicle body 1.

As illustrated in FIGS. 4 and 5, the attachment part 15 includes the first coupling attachment part 30 and the second coupling attachment part 50. In other words, the first coupling attachment part 30 and the second coupling attachment part 50 serve as both the coupling part 13 and the attachment part 15. The coupling part 13 and the attachment part 15 are arranged to overlap each other in the front-rear direction.

As illustrated in FIG. 5(b), the attachment part 15 is attached to the vehicle body attachment part 3 of the front ventilation opening 2 using a fastening screw 8.

The vehicle body attachment part 3 is formed on an opening edge of the front ventilation opening 2. The first coupling attachment part 30 is formed on the frame 21 of the inner grille 20. The second coupling attachment part 50 is formed on a back surface 40k of the outer grille 40.

For example, a tapping screw is sufficient to be used as the fastening screw (fastener) 8.

The vehicle body attachment parts 3 are provided at a plurality of positions on the opening edge of the front ventilation opening 2. The vehicle body attachment part 3 is formed of steel or the like, and integrally formed on the vehicle body 1. The vehicle body attachment part 3 protrudes from the opening edge of the front ventilation opening 2 toward an opening center, and is formed in a substantially rectangular planar shape facing the front-rear direction.

A vehicle body-positioning hole 4 penetrating in the front-rear direction is formed substantially in a center of the vehicle body attachment part 3. The vehicle body-positioning hole 4 is formed in an elliptical shape.

The fastening screw 8 is inserted into the vehicle body-positioning hole 4 from behind.

The first coupling attachment parts 30 are integrally molded at a plurality of positions on the frame 21 of the inner grille 20. In other words, the inner grille 20 and the first coupling attachment parts 30 have an integral structure. The first coupling attachment part 30 is provided at a position corresponding to the vehicle body attachment part 3.

The first coupling attachment part 30 includes the first attachment part 31 which is brought into close contact with the vehicle body attachment part 3. The first attachment part 31 has a surface orthogonal to the front-rear direction, and is formed in a substantially rectangular planar shape.

The positioning hole 32 penetrating in the front-rear direction is formed substantially in a center of the first attachment part 31. The positioning hole 32 is formed at a position corresponding to the vehicle body-positioning hole 4. The positioning hole 32 has an elliptical shape, an inner diameter of which is substantially the same as an inner diameter of the vehicle body-positioning hole 4.

As illustrated in FIGS. 6A and 6B, the first coupling attachment part 30 includes receiving side walls 33 that receive the second coupling attachment part 50.

The receiving side walls (side walls) 33 are erected forward from outer peripheral edges in the up-down direction of the first attachment part 31. The receiving side walls 33 extend in the front-rear direction and the left-right direction. The pair of receiving side walls 33 faces and comes into contact with a pair of first outer peripheral edges 54 which will be described later. As a result, rotation of the first attachment part 31 in the X direction is suppressed.

In other words, when the first attachment part 31 and the second attachment part 51 are made to overlap each other, the second attachment part 51 of the second coupling attachment part 50 is received between the receiving side walls 33 of the first coupling attachment part 30. The first outer peripheral edges 54 of the second attachment part 51 face and come into contact with the receiving side walls 33 (outer surfaces of the first outer peripheral edges 54 come into contact with inner surfaces of the receiving side walls 33). Since the first outer peripheral edges 54 are formed in a non-circular shape, and received while each surface of the first outer peripheral edges 54 abuts on the corresponding surface of the receiving side walls 33, the second attachment part 51 cannot rotate in the X direction with respect to the first attachment part 31.

The second coupling attachment parts 50 are integrally molded at a plurality of positions on the back surface 40k of the outer grille 40. In other words, the outer grille 40 and the second coupling attachment parts 50 have an integral structure. The second coupling attachment part 50 is provided at a position corresponding to the vehicle body attachment part 3 and the first coupling attachment part 30.

The second coupling attachment part 50 includes the second attachment part 51 having a surface which is brought into close contact with a front surface of the first attachment part 31. The second attachment part 51 has a surface orthogonal to the front-rear direction, and is formed in a substantially rectangular planar shape.

A positioning boss 52 having a cylindrical shape and protruding backward is formed substantially in a center of the second attachment part 51. The positioning boss 52 is formed at a position that overlaps the vehicle body-positioning hole 4 and the positioning hole 32. The positioning boss 52 has an outer diameter that is substantially the same as the inner diameters of the vehicle body-positioning hole 4 and the positioning hole 32. The positioning boss 52 has a protrusion length that is the same as or slightly shorter than a total thickness of the vehicle body-positioning hole 4 and the positioning hole 32. The positioning boss 52 is inserted into the vehicle body-positioning hole 4 and the positioning hole 32.

A fastening hole 53 facing forward is formed in a center of a distal end of the positioning boss 52. The fastening screw 8 is screwed into the fastening hole 53.

The first outer peripheral edges 54 are formed on the second attachment part 51 of the second coupling attachment part 50. The first outer peripheral edges 54 abut on the receiving side walls 33 of the first coupling attachment part 30. The first outer peripheral edges 54 are outer peripheral edges formed at both sides in the up-down direction of the second attachment part 51, and formed along the left-right direction.

The attachment part 15 operates when the radiator grille 10 as the coupled state of the inner grille 20 and the outer grille 40 is attached to the front ventilation opening 2 of the vehicle body 1.

Specifically, the radiator grille 10 is arranged in front of the vehicle body attachment part 3. Then, the fastening screw 8 is screwed into the fastening hole 53 of the positioning boss 52 exposed from the vehicle body-positioning hole 4. As a result, the vehicle body attachment part 3 and the second attachment part 51 are fastened to each other, and the radiator grille 10 is attached to the front ventilation opening 2 of the vehicle body 1.

When the second attachment part 51 is attached to the vehicle body attachment part 3 using the fastening screw 8, the first attachment part 31 is simultaneously arranged to be held between the vehicle body attachment part 3 and the second attachment part 51. As a result, the vehicle body attachment part 3, the first attachment part 31, and the second attachment part 51 are fixed. In other words, positions in the X direction of the vehicle body attachment part 3, the first attachment part 31, and the second attachment part 51 are determined.

Since the positioning boss 52 is fit into the vehicle body-positioning hole 4 and the positioning hole 32, the vehicle body attachment part 3, the first attachment part 31, and the second attachment part 51 are positioned. In other words, positions in the Y direction and the Z direction of the vehicle body attachment part 3, the first attachment part 31, and the second attachment part 51 are determined.

Since the vehicle body attachment parts 3, the first attachment parts 31, and the second attachment parts 51 are provided at a plurality of positions, postures around the X direction, the Y direction, and the Z direction of the vehicle body attachment parts 3, the first attachment parts 31, and the second attachment parts 51 are also determined.

Since the first attachment part 31 and the second attachment part 51 are made to overlap each other, the second attachment part 51 of the second coupling attachment part 50 is received between the receiving side walls 33 of the first coupling attachment part 30. At this time, the first outer peripheral edges 54 of the second attachment part 51 face and come into contact with the receiving side walls 33 (the outer surfaces of the first outer peripheral edges 54 come into contact with the inner surfaces of the receiving side walls 33). Since the first outer peripheral edges 54 are formed in the non-circular shape, and received while each surface of the first outer peripheral edges 54 abuts on the corresponding surface of the receiving side walls 33, the second attachment part 51 can no longer rotate in the X direction with respect to the first attachment part 31.

When the vehicle body attachment part 3 and the second attachment part 51 are attached using the fastening screw 8, rotation torque applied to the fastening screw 8 is transmitted to the second attachment part 51 to try to rotate the second attachment part 51.

If the second attachment part 51 is rotated together with the rotation of the fastening screw 8, a front surface 40f of the outer grille 40 or the like is deformed, and appearance quality is deteriorated.

In the radiator grille 10, however, since the first outer peripheral edges 54 abut on the receiving side walls 33, the second attachment part 51 cannot rotate in the X direction even if the rotation torque is applied to the fastening screw 8. Therefore, the front surface 40f of the outer grille 40 or the like is prevented from being deformed. As a result, the appearance quality of the outer grille 40 can be maintained.

As mentioned above, since the radiator grille 10 including the inner grille 20 and the outer grille 40 has the attachment part 15, the radiator grille 10 is attached to the front ventilation opening 2 of the vehicle body 1.

The radiator grille 10 includes the outer grille 40, the inner grille 20, the coupling part 13 that couples the outer grille 40 to the inner grille 20, and the attachment part 15 that attaches the radiator grille 10 to the vehicle body 1.

The coupling part 13 and the attachment part 15 are arranged close to each other. As a result, since the number of fastening positions is reduced, a product cost and an assembling cost can be reduced. In particular, since the coupling part 13 and the attachment part 15 are arranged to overlap each other in the front-rear direction, the number of fastening positions can be reduced.

By using the radiator grille 10, i.e. the coupled state of the inner grille 20 and the outer grille 40, attachment accuracy between the outer grille 40 and the vehicle body 1 can be improved since the outer grille 40 is directly attached to the vehicle body 1 using the attachment part 15.

Since the radiator grille 10 includes the receiving side walls 33 and the first outer peripheral edges 54, an influence of tightening torque applied when the outer grille 40 is attached to the vehicle body 1 can be suppressed. As a result, the appearance quality of the outer grille 40 can be maintained.

Figure 9:
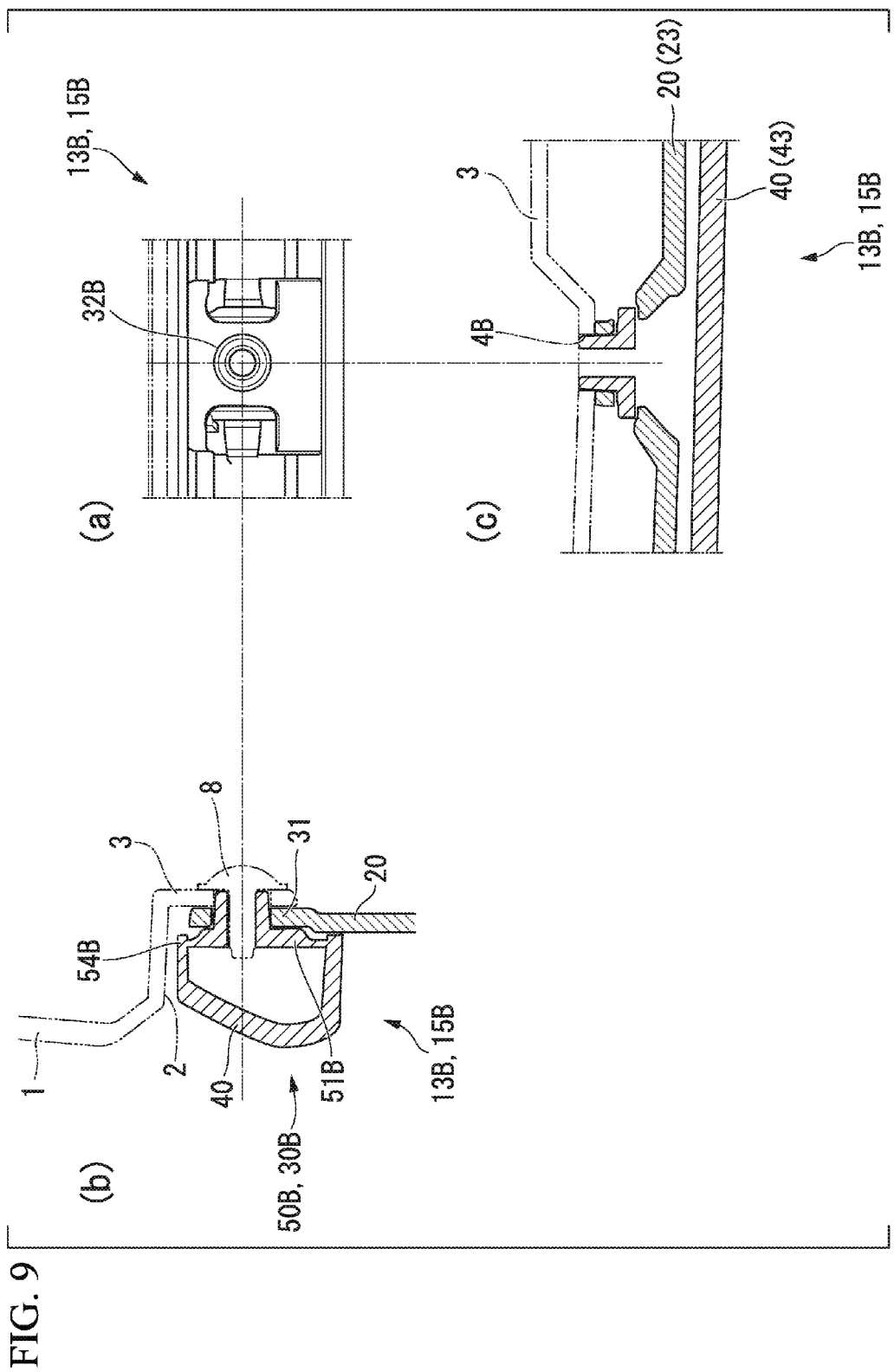
FIG. 9 is a view representing the coupling part 13 and the attachment part 15 or the like arranged at a position B of FIG. 1B, where (a) is a back view, (b) is a longitudinal sectional view, and (c) is a cross-sectional view.

FIG. 9 is a view representing the coupling part 13 and the attachment part 15 or the like arranged at a position B of FIG. 1B, where (a) is a back view, (b) is a longitudinal sectional view, and (c) is a cross-sectional view.

Figure 10:
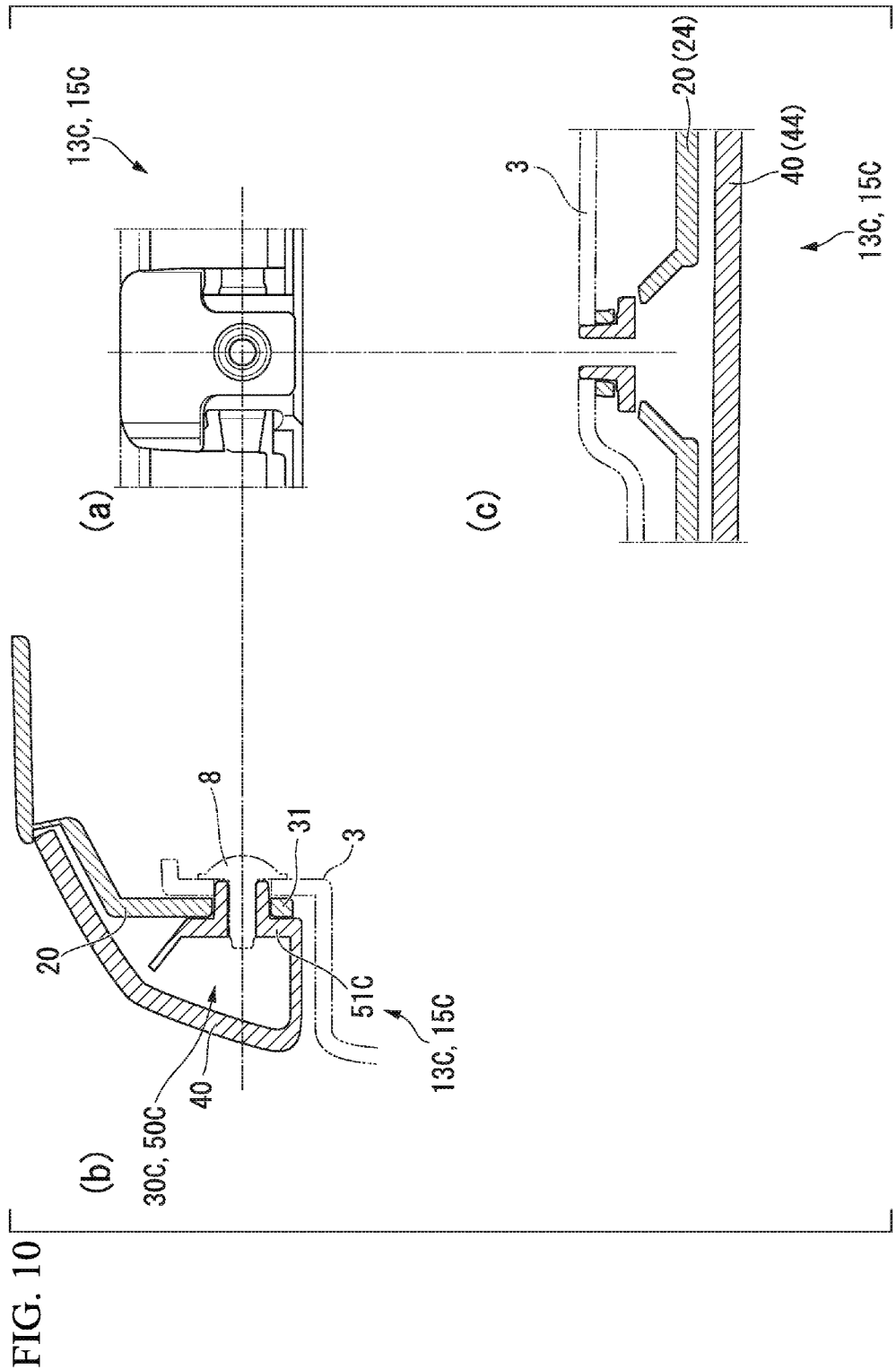
FIG. 10 is a view representing the coupling part 13 and the attachment part 15 or the like arranged at a position C of FIG. 1B, where (a) is a back view, (b) is a longitudinal sectional view, and (c) is a cross-sectional view.

FIG. 10 is a view representing the coupling part 13 and the attachment part 15 or the like arranged at a position C of FIG. 1B, where (a) is a back view, (b) is a longitudinal sectional view, and (c) is a cross-sectional view.

Figure 11:
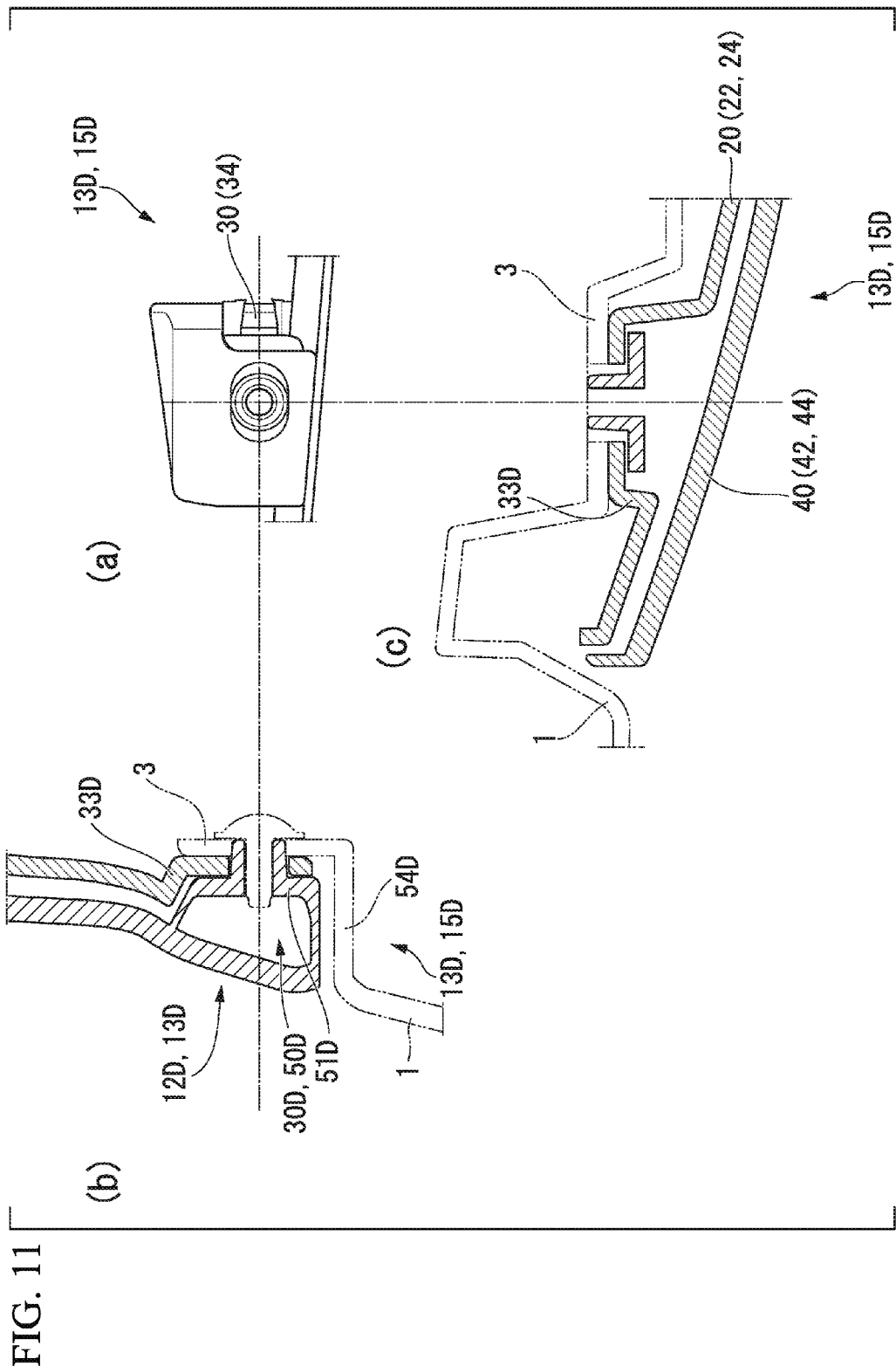
FIG. 11 is a view representing the coupling part 13 and the attachment part 15 or the like arranged at a position D of FIG. 1B, where (a) is a back view, (b) is a longitudinal sectional view, and (c) is a cross-sectional view.

FIG. 11 is a view representing the coupling part 13 and the attachment part 15 or the like arranged at a position D of FIG. 1B, where (a) is a back view, (b) is a longitudinal sectional view, and (c) is a cross-sectional view.

The vehicle body attachment part 3 is not illustrated in the back views in FIGS. 9(a), 10(a), and 11(a).

The coupling parts 13 and the attachment parts 15 are provided at the plurality of positions on the radiator grille 10. Although the coupling parts and the attachment parts or the like illustrated in FIGS. 9 to 11 have functions which are the same as those of the coupling part 13 and the attachment part 15 or the like illustrated in FIGS. 4 to 8C, their shapes are slightly different.

In the following description, the coupling part 13B and the attachment part 15B are arranged at the position B of FIG. 1B, the coupling part 13C and the attachment part 15C are arranged at the position C of FIG. 1B, and the coupling part 13D and the attachment part 15D are arranged at the position D of FIG. 1B.

As illustrated in FIG. 9, the coupling part 13B and the attachment part 15B are provided at the lateral frame 23 on the upper side of the inner grille 20 and the lateral frame 43 on the upper side of the outer grille 40. Taking the design or the like into consideration, it is not possible to increase a height of the lateral frame 23 or the lateral frame 43. Therefore, a first coupling attachment part 30B of the attachment part 15B cannot have the receiving side walls 33.

In the attachment part 15B, however, a first outer peripheral edge 54B of a second coupling attachment part 50B abuts on the opening edge (vehicle body 1) of the front ventilation opening 2. As a result, the influence of the tightening torque applied when the outer grille 40 is attached to the vehicle body 1 can be suppressed.

A vehicle body-positioning hole 4B and a positioning hole 32B are formed in a circular shape. Thus, when the radiator grille 10 is attached to the vehicle body 1, the vehicle body-positioning hole 4B and the positioning hole 32B function as a positioning part for the positioning in the X direction and the Y direction.

As illustrated in FIG. 10, the coupling part 13C and the attachment part 15C are provided at the lateral frame 24 on the lower side of the inner grille 20 and the lateral frame 44 on the lower side of the outer grille 40. Taking the design or the like into consideration, it is not possible to increase a height of the lateral frame 24 or the lateral frame 44. Therefore, a first coupling attachment part 30C of the attachment part 15C cannot have the receiving side walls 33.

In the attachment part 15C, however, a first outer peripheral edge 54C of a second attachment part 51C of a second coupling attachment part 50C abuts on the opening edge (vehicle body 1) of the front ventilation opening 2. As a result, the influence of the tightening torque applied when the outer grille 40 is attached to the vehicle body 1 can be suppressed.

As illustrated in FIG. 11, the coupling part 13D and the attachment part 15D are provided at an intersection of the vertical frame 22 and the lateral frame 24 of the inner grille 20, and an intersection of the vertical frame 42 and the lateral frame 44 of the outer grille 40. Taking the design, spatial restrictions or the like into consideration, it is not possible to expand these intersections. Therefore, a first coupling attachment part 30D of the attachment part 15D can have only a single receiving side wall 33D.

In the attachment part 15D, however, a first outer peripheral edge 54D of a second attachment part 51D of a second coupling attachment part 50D abuts on the opening edge (vehicle body 1) of the front ventilation opening 2. As a result, the influence of the tightening torque applied when the outer grille 40 is attached to the vehicle body 1 can be suppressed.

In the coupling part 13D, the first coupling attachment part 30D has only a single locking claw 34D. However, even in the case where the first coupling attachment part 30D has only the single locking claw 34D, the second attachment part 51D of the second coupling attachment part 50D can be held between the locking claw 34D and the first attachment part 31D. As a result, the inner grille 20 and the outer grille 40 can be coupled to each other without using the coupling screw or the like.

The shapes and combinations or the like of the respective components described in the above-mentioned embodiment are only examples, and can be variously changed depending on design requirements or the like within the scope not deviating from the gist of the present invention.

The present invention is not limited to the case where the locking claws 34 are provided at both sides (either side) in the left-right direction of the first attachment part 31, and the second outer peripheral edges 55 are provided at both sides (either side) in the left-right direction of the second attachment part 51.

The locking claws 34 may be provided at both sides (either side) in the up-down direction of the first attachment part 31, and the second outer peripheral edges 55 may be provided at both sides (either side) in the up-down direction of the second attachment part 51. In this case, the receiving side walls 33 are provided at both sides (either side) in the left-right direction of the first attachment part 31, and the first outer peripheral edges 54 are provided at both sides (either side) in the left-right direction of the second attachment part 51.

In addition, the present invention is not limited to the case where the vehicle body-positioning hole 4B and the positioning hole 32B are formed in the circular shape. In place of the vehicle body-positioning hole 4B and the positioning hole 32B, the vehicle body-positioning hole 4 and the positioning hole 32 may be formed in the circular shape so as to function as the positioning part for the positioning in the X direction and the Y direction when the radiator grille 10 is attached to the vehicle body 1.

DESCRIPTION OF THE REFERENCE NUMERALS

1 Vehicle body
2 Front ventilation opening
3 Vehicle body attachment part
4 Vehicle body-positioning hole
8 Fastening screw (fastener)
10 Radiator grille
13 Coupling part
15 Attachment part
20 Inner grille
31 First attachment part
32 Positioning hole
33 Receiving side wall (side wall)
34 Locking claw
35 Flexible part
40 Outer grille
51 Second attachment part
52 Positioning boss
54 First outer peripheral edge
55 Second outer peripheral edge

The invention claimed is:

1. A radiator grille, comprising:
an inner grille arranged on a front ventilation opening of a vehicle body;
an outer grille arranged in front of the inner grille;
a coupling part which couples the inner grille to the outer grille; and
an attachment part which attaches the inner grille and the outer grille to the vehicle body, wherein
the coupling part and the attachment part are arranged close to each other;
the coupling part comprises:
a locking claw formed on the inner grille and extending rearward from the inner grille,
a first attachment part formed on the inner grille and positioned in a rear side of the locking claw, and
a second attachment part formed on the outer grille; and
the inner grille and the outer grille are configured to be coupled and fixed to each other by holding the second attachment part between the first attachment part and the locking claw.

2. The radiator grille according to claim 1, wherein the coupling part and the attachment part are arranged to overlap each other in a front-rear direction.

3. The radiator grille according to claim 1, wherein the locking claw has a flexible part that bends in a direction crossing the front-rear direction, and
the second attachment part has a second outer peripheral edge configured to bend the flexible part when the inner grille and the outer grille are coupled to each other.

4. The radiator grille according to claim 1, wherein the first attachment part and the second attachment part are also used as the attachment part, and
the first attachment part is configured to be held between a vehicle body attachment part formed on an opening edge of the front ventilation opening and the second attachment part while the inner grille and the outer grille are attached to the vehicle body.

5. The radiator grille according to claim 4, wherein the second attachment part has a first outer peripheral edge formed in a non-circular shape, and
the first attachment part has a side wall that faces and comes into contact with the first outer peripheral edge.

6. The radiator grille according to claim 4, wherein the first attachment part has a positioning hole arranged at a position corresponding to a vehicle body-positioning hole formed in the vehicle body attachment part, and
the second attachment part has a positioning boss that is fit into the vehicle body-positioning hole and the positioning hole.

7. A radiator grille, comprising:
an inner grille arranged on a front ventilation opening of a vehicle body;
an outer grille arranged in front of the inner grille;
a coupling part which couples the inner grille to the outer grille; and
an attachment part which attaches the inner grille and the outer grille to the vehicle body, wherein
the coupling part and the attachment part are arranged close to each other;
the coupling part comprises:
a first attachment part formed on the inner grille, a locking claw formed on the inner grille and facing the first attachment part in a front-rear direction, and a second attachment part formed on the outer grille;

the inner grille and the outer grille are configured to be coupled and fixed to each other by holding the second attachment part between the first attachment part and the locking claw; and the second attachment part comprises a fastening hole and is directly attached to the vehicle body using a fastener and the fastening hole.

* * * * *